United States Patent
Zhang et al.

(10) Patent No.: US 9,547,429 B1
(45) Date of Patent: Jan. 17, 2017

(54) VISUALIZED STORAGE PROVISIONING

(71) Applicant: CA, Inc., Islandia, NY (US)

(72) Inventors: Kai Zhang, Beijing (CN); Xin Wang, ChangSha (CN); Anan Wu, Beijing (CN); Bo Feng, Beijing (CN); Haijian Ren, Sanhe (CN)

(73) Assignee: CA, Inc., New York, NY (US)

( * ) Notice: Subject to any disclaimer, the term of this patent is extended or adjusted under 35 U.S.C. 154(b) by 222 days.

(21) Appl. No.: 13/903,552

(22) Filed: May 28, 2013

(51) Int. Cl.
*G06F 3/0486* (2013.01)

(52) U.S. Cl.
CPC .................................. *G06F 3/0486* (2013.01)

(58) Field of Classification Search
CPC ...... H04L 67/1097; H04L 67/36; G06F 3/067; G06F 3/0482; G06F 3/04842; G06F 17/30882; G06F 3/0605
See application file for complete search history.

(56) References Cited

U.S. PATENT DOCUMENTS

| | | | | |
|---|---|---|---|---|
| 5,890,204 | A * | 3/1999 | Ofer et al. ..................... 711/111 |
| 7,681,130 | B1 * | 3/2010 | Lavallee ................. H04L 41/22 715/735 |
| 8,850,344 | B1 * | 9/2014 | Rowlette ............... G06F 3/0486 715/769 |
| 9,021,198 | B1 * | 4/2015 | Vijayan ................... G06F 3/067 711/112 |
| 9,081,594 | B1 * | 7/2015 | Labonte .............. G06F 9/44521 |
| 2004/0085347 | A1 * | 5/2004 | Hagarty, Jr. ............ H04L 41/22 715/735 |
| 2005/0193231 | A1 * | 9/2005 | Scheuren ............. G06F 3/0622 714/5.1 |
| 2005/0240727 | A1 * | 10/2005 | Shah et al. ..................... 711/114 |
| 2008/0189700 | A1 * | 8/2008 | Schmidt ............... G06F 11/203 718/1 |
| 2009/0112919 | A1 * | 4/2009 | De Spiegeleer .. G06F 17/30067 |

OTHER PUBLICATIONS

Steve Strutt, An Introduction to Storage Provisioning with Tivoli Provisioning Manager and TotalStorage Productivity Center, Jul. 2005, IBM, First Edition, cover page, pp. i, ii, and 8. http://www.redbooks.ibm.com/redpapers/pdfs/redp3900.pdf.*
dotHILL, SANscape User's Guide, Mar. 2005, Dot Hill Systems Corp., Version 4.0, 83-00003431, Revision A, pp. i-296, particularly pp. i, ii, 58, 65-67, and 99.*
"CA Server Automation" Retrieved Mar. 27, 2013 from http://www.ca.com/us/~/media/Files/ProductBriefs/ca-server-automation-ps-0611.pdf , © 2012, 2 pp.

(Continued)

*Primary Examiner* — Li Sun
*Assistant Examiner* — Terri Filosi
(74) *Attorney, Agent, or Firm* — Myers Bigel, P.A.

(57) ABSTRACT

A graphical representation of available Storage Area Networks (SANs) and of available hosts is displayed. Storage is provisioned from a selected SAN to a selected host in response to dragging and dropping the graphical representation of the selected SAN into the graphical representation of the selected host. Thus, a drag-and-drop metaphor may be used to facilitate storage provisioning. Related methods, systems and computer program products are disclosed.

14 Claims, 14 Drawing Sheets

(56) References Cited

OTHER PUBLICATIONS

"Provisioning in and out of the Cloud with Ease." *ITBusinessEdge*, Retrieved Mar. 27, 2013 http://www.itbusinessedge.com/guest-opinions/provisioning-and-out-cloud-ease , 3 pp.

Steve Strutt, "An Introduction to Storage Provisioning with Tivoli Provisioning Manager and Total Storage Productivity Center," *Redpaper* Retrieved Mar. 27, 2013 from http://www.redbooks.ibm.com/redpapers/pdfs/redp3900.pdf , © 2005, pp. 41-56.

\* cited by examiner

VISUALIZED STORAGE PROVISIONING

BACKGROUND

Various embodiments described herein relate to computer systems, methods and program products and, more particularly, to storage provisioning computer systems, methods and program products.

Storage provisioning is the process of assigning storage, usually in the form of server disk drive space, in order to optimize the performance of a Storage Area Network (SAN). Traditionally, provisioning has been done by a SAN administrator, and can be a tedious process.

Storage provisioning is often performed in steps, which generally must be followed in a specific order. Specifically, the storage is configured for optimum SAN performance. Logical Unit Numbers (LUNs) are assigned within the network. The administrator confirms that the data storage and recovery routes will be available to all users when needed. Alternate routes are put in place that can keep the SAN functional in the event of partial failure. The administrator confirms that the SAN can accommodate expected future expansion. After everything has been connected and all the programs have been installed, the entire SAN generally is tested before sensitive and valuable data is committed to it.

In recent years, automated storage provisioning, also called auto-provisioning, computer programs have become available. These programs can reduce the time required for the storage provisioning process, and can free the administrator from the often distasteful task of performing this chore manually.

One example of a computer program that can provide automated storage provisioning is "CA Server Automation". CA Server Automation is an integrated data center management solution that automates provisioning, patching and configuration of operating system, storage, network and application components across physical, virtual and public cloud systems. It can greatly simplify server operations and system management tasks and can increase the speed and accuracy of delivering IT services. See the Data Sheet entitled "*CA Server Automation*", CA Publication No. CS2674_0812, the disclosure of which is hereby incorporated herein by reference as if set forth fully herein.

BRIEF SUMMARY

Various embodiments described herein can provide methods, systems and/or computer program products for visualized storage provisioning. In particular, a method according to various embodiments described herein comprises displaying a graphical representation of a plurality of available Storage Area Networks (SANs) and a plurality of available hosts, and provisioning storage from a selected SAN of the plurality of available SANs to a selected host of the plurality of available hosts in response to dragging and dropping the graphical representation of the selected SAN into the graphical representation of the selected host. The provisioning itself may be performed by calling a provisioning program to provision the storage from the selected SAN to the selected host. Thus, a drag-and-drop metaphor may be used to facilitate storage provisioning.

In some embodiments, the provisioning comprises provisioning storage from a selected SAN to a selected host in response to dragging and dropping the graphical representation of the selected SAN into the graphical representation of the selected host and further in response to receiving credential information (such as host security information) and storage provision information. The storage provision information may comprise an identification of a size and a protocol of the storage that is provisioned. Moreover, in some embodiments, the provisioning may also comprise provisioning storage from a selected SAN to a selected host further in response to receiving a confirmation to provision.

Storage provisioning methods according to various embodiments described herein may further comprise displaying a graphical link between the graphical representation of the selected SAN and the graphical representation of the selected host in response to the dragging and dropping the graphical representation of the selected SAN into the graphical representation of the selected host, and changing the graphical link between the graphical representation of the selected SAN and the graphical representation of the selected host in response to the provisioning the storage from the selected SAN to the selected host. Moreover, in some embodiments, the displaying further comprises displaying a graphical representation of a plurality of storage pools for at least one of the plurality of SANs. A graphical representation of utilization of the plurality of storage pools may also be displayed. The provisioning may further comprise provisioning storage from a selected storage pool of a selected SAN to a selected host in response to dragging and dropping the graphical representation of the selected storage pool of the selected SAN into the graphical representation of the selected host. In still other embodiments, the provisioning may further comprise identifying a storage pool of a selected SAN, and provisioning storage from the storage pool of the selected SAN that was identified to a selected host in response to dragging and dropping the graphical representation of the selected SAN into the graphical representation of the selected host.

In yet other embodiments, the provisioning comprises provisioning storage from a plurality of selected SANs to a plurality of selected hosts in response to repeatedly dragging and dropping a graphical representation of a selected one of the SANs into a graphical representation of a selected one of the hosts and further in response to receiving a confirmation to provision all. Storage provisioning according to yet other embodiments may further comprise displaying a graphical link between the graphical representation of the selected SAN and the graphical representation of the selected host in response to the dragging and dropping the graphical representation of the selected SAN into the graphical representation of the selected host, wherein the graphical link includes a protocol indicator and/or a provisioning status indicator. Moreover, the displaying may be preceded by identifying the plurality of SANs and the plurality of available hosts.

It will be understood that various embodiments have been described above in connection with storage provisioning methods. However, various other embodiments described herein can provide a computer system such as a server that can be used to provision storage according to any of the embodiments described herein. Analogous storage provisioning computer program products may also be provided according to any of the embodiments described herein.

It is noted that aspects described herein with respect to one embodiment may be incorporated in different embodiments although not specifically described relative thereto. That is, all embodiments and/or features of any embodiments can be combined in any way and/or combination. Moreover, other systems, methods, and/or computer program products according to embodiments will be or become apparent to one with skill in the art upon review of the following drawings and detailed description. It is intended that all such additional systems, methods, and/or computer program products be included within this description, be within the scope of the present disclosure, and be protected by the accompanying claims.

BRIEF DESCRIPTION OF THE DRAWINGS

The accompanying drawings, which are included to provide a further understanding of the present disclosure and are incorporated in and constitute a part of this application, illustrate certain embodiment(s). In the drawings.

DETAILED DESCRIPTION

Various embodiments will be described more fully hereinafter with reference to the accompanying drawings. Other embodiments may take many different forms and should not be construed as limited to the embodiments set forth herein. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the various embodiments described herein. As used herein, the term "and/or" includes any and all combinations of one or more of the associated listed items.

The terminology used herein is for the purpose of describing particular embodiments only and is not intended to be limiting to other embodiments. As used herein, the singular forms "a", "an" and "the" are intended to include the plural forms as well, unless the context clearly indicates otherwise. It will be further understood that the terms "comprises," "comprising," "includes" and/or "including", "have" and/or "having" when used herein, specify the presence of stated features, integers, steps, operations, elements, and/or components, but do not preclude the presence or addition of one or more other features, integers, steps, operations, elements, components, and/or groups thereof. In contrast, the term "consisting of" (and variants thereof) when used in this specification, specifies the stated features, integers, steps, operations, elements, and/or components, and precludes additional features, integers, steps, operations, elements and/or components. Elements described as being "to" perform functions, acts and/or operations may be configured to or other structured to do so. As used herein, the term "and/or" includes any and all combinations of one or more of the associated listed items and may be abbreviated as "/".

Unless otherwise defined, all terms (including technical and scientific terms) used herein have the same meaning as commonly understood by one of ordinary skill in the art to which various embodiments described herein belong. It will be further understood that terms used herein should be interpreted as having a meaning that is consistent with their meaning in the context of this specification and the relevant art and will not be interpreted in an idealized or overly formal sense unless expressly so defined herein.

Figure 1:
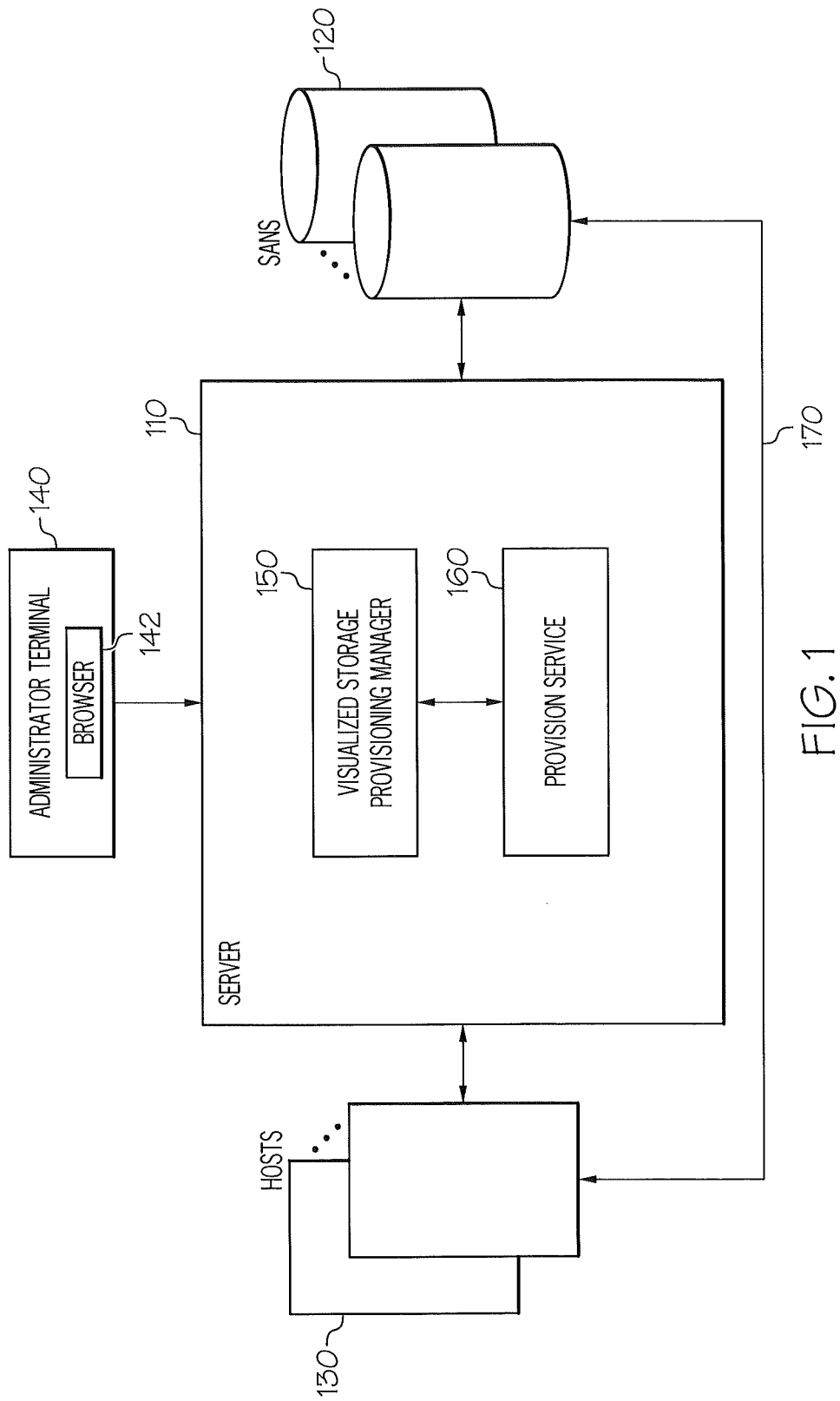
FIG. 1 is a block diagram of storage provisioning systems, methods and computer program products according to various embodiments described herein.

FIG. 1 is a block diagram of visualized storage provisioning systems, methods and computer program products according to various embodiments described herein. Referring to FIG. 1, visualized storage provisioning may be performed using a server 110 to assign a plurality of available SANs 120 to a plurality of available hosts 130. The server 110 may be controlled by an administrator using one or more administrator terminals 140. In some embodiments, the administrator terminal may contain a Web browser 142

The server 110 can provide management functions for an integrated data center management solution, including functionality according to various embodiments described herein. The server 110 may be embodied in a standalone unit or may be contained as part of other computing infrastructure, such as a client-server and/or cloud computing environment. The server 110 may be embodied as one or more enterprise, application, personal, pervasive and/or embedded computer systems that are operable to receive, transmit, process and store data using any suitable combination of software, firmware and/or hardware and that may be standalone or interconnected by any conventional, public and/or private, real and/or virtual, wired and/or wireless network including all or a portion of the global communication network known as the Internet, and may include various types of tangible, non-transitory computer readable medium. The server 110 may also include a network transceiver, processor, memory and/or other circuitry.

The server 110 may be controlled by an administrator, using, for example, one or more administrator terminals 140. An administrator terminal 140 may include tablets and/or smart phones, laptop and/or desktop computers, and/or any other user terminal. In general, the administrator terminal 140 may be embodied by one or more enterprise, application, personal, pervasive and/or embedded computers, such as a desktop, notebook, net book, laptop, smart phone, electronic book reader and/or any other embedded device.

The server 110 includes therein a virtualized storage provisioning system, method and/or computer program product, collectively referred to herein as a "visualized storage provisioning manager" 150, according to various embodiments described herein. A server management system, method and/or computer program product, collectively referred to herein as a "provision service" 160, may also be included. The provision service 160 may be embodied by, for example, the above-cited CA Server Automation computer program product.

The visualized storage provisioning manager 150 and the provision service 160 may be stored in one or more memory devices of the server 110, and may execute on one or more processors of the server 110. The processor(s) are configured to execute computer program code from memory device(s), to perform at least some of the operations and methods described herein, and may comprise any conventional or special purpose processor, including a Digital Signal Processor (DSP), Field Programmable Gate Array (FPGA), Application-Specific Integrated Circuit (ASIC) and/or multi-core processors. The memory devices may include nonvolatile storage, such as a hard disk drive, flash memory and/or like devices that may store computer program instructions and data on computer-readable media, and/or one or more volatile memory devices, such as random access memory.

Embodiments of FIG. 1 have been illustrated using a Web browser-server architecture, wherein the provision service 160 and the visualized storage provisioning manager 150 are included in the server 110, and interaction with the administrator terminal 140 takes place via a browser 142 that receives Web pages and transmits administrator responses. However, in other embodiments, the visualized storage provisioning manager 150 may also be included at least in part in a manager user interface in an administrator terminal 140. For example, in a traditional client-server environment, the client may host the manager user interface including at least some of the visualized storage provisioning manager 150, and the administrator may use the client device to manage the server 110 for storage provisioning. The server 110 may host the back end functionalities, including storage provisioning functions as well as other functionalities, such as discovery, registering, monitoring, etc. Moreover, in still other embodiments, the visualized storage provisioning manager 150 may be contained entirely in the administrator terminal 140, wherein, for example, the administrator terminal 140 natively runs the visualized storage provisioning manager 150 as an application, commonly referred to as an "app". Accordingly, in general, the visualized storage provisioning manager 150 may be contained entirely within the server 110, may be contained entirely within the administrator terminal 140, or may be distributed across the server 110 and the administrator terminal 140.

A plurality of SANs 120 interface with the server 110. As is well known, a SAN is a dedicated network that provides access to consolidated, block level data storage. SANs are primarily used to make storage devices, such as disk arrays, tape libraries, and optical jukeboxes, accessible to servers so that the devices appear like locally attached devices to the operating system. A SAN typically has its own network of storage devices that are generally not accessible through the local area network by other devices. The cost and complexity of SANs dropped in the early 2000s to levels allowing wider adoption across both enterprise and small to medium sized business environments.

Finally, a plurality of hosts 130 also interface with the server 110. Each host 130 may be embodied in a standalone unit or may be contained as part of other computing infrastructure, such as a client-server and/or cloud computing environment. The host 130 may be embodied as one or more enterprise, application, personal, pervasive and/or embedded computer systems that are operable to receive, transmit, process and store data using any suitable combination of software, firmware and/or hardware and that may be stand-alone or interconnected by any conventional, public and/or private, real and/or virtual, wired and/or wireless network including the Internet, and may include various types of tangible, non-transitory computer readable medium. The host 130 may also include a network transceiver, processor, memory and/or other circuitry. A data link 170 may provide a physical connection, such as a high speed physical connection, between the hosts 130 and the SANs 120. The provisioning operations that will be described below may be used to create specific logical connections between hosts 130 and SANs 120 on top of the physical connection. After provisioning, a host 130 can use a SAN to store data.

Finally, it will be understood that the communications paths among the server 110, the SANs 120, the host 130 and the administrator terminal 140 may be embodied by any conventional, public and/or private, real and/or virtual, wired and/or wireless network including the Internet, and may include various types of tangible, non-transitory computer readable medium. Moreover, the various networks may overlap at least in part.

Various embodiments described herein can provide a visual way to provision storage in a virtualization and/or cloud computing environment. Moreover, various embodiments described herein can support touchable devices that may be used by a modern enterprise system administrator. Present storage provision managers, such as provided by CA Server Automation, may use a set of wizard pages or a set of configuration files to facilitate provisioning. A wizard or setup assistant is a user interface type that presents a user with a sequence of dialog boxes that lead the user through a series of well-defined tasks. In sharp contrast, various embodiments described herein can provide storage provisioning by displaying a graphical representation of a plurality of available SANs and a plurality of available hosts, and provisioning storage from a selected SAN to a selected host in response to dragging and dropping the graphical representation of the selected SAN into the graphical representation of the selected host.

Various embodiments described herein can provide improved usability by providing a visual way to provision. Moreover, various embodiments described herein can support touch screen devices and support better usability and visual sense to users. System administrators may use touchable devices to monitor and manage their systems. However, traditional configuration tools and wizards may not provide good usability and may not take advantage of the capabilities of touch screen devices. In contrast, various embodiments described herein can use a drag-and-drop metaphor to drag and drop SANs to hosts in a visual representation.

Figure 2:
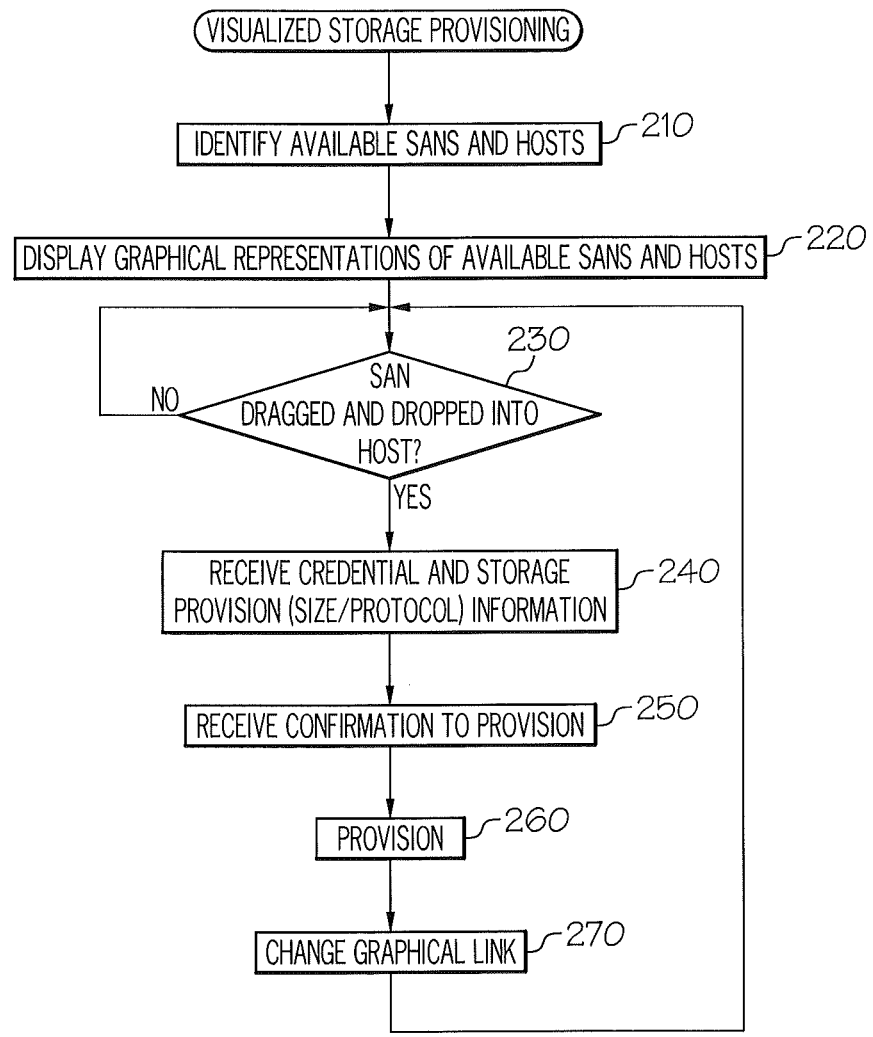
FIG. 2 is a flowchart of operations that may be performed for visualized storage provisioning according to various embodiments described herein.

FIG. 2 is a flowchart of operations that may be performed to provide visualized storage provisioning according to various embodiments described herein. These operations may be performed by a visualized storage provisioning manager 150 of FIG. 1.

Referring now to FIG. 2, at Block 210, available SANs and hosts are identified. Available SANs and hosts may be identified by administrator specification and/or using automated discovery mechanisms that may be provided, for example, in a server management product, such as CA Server Automation.

Figure 3:
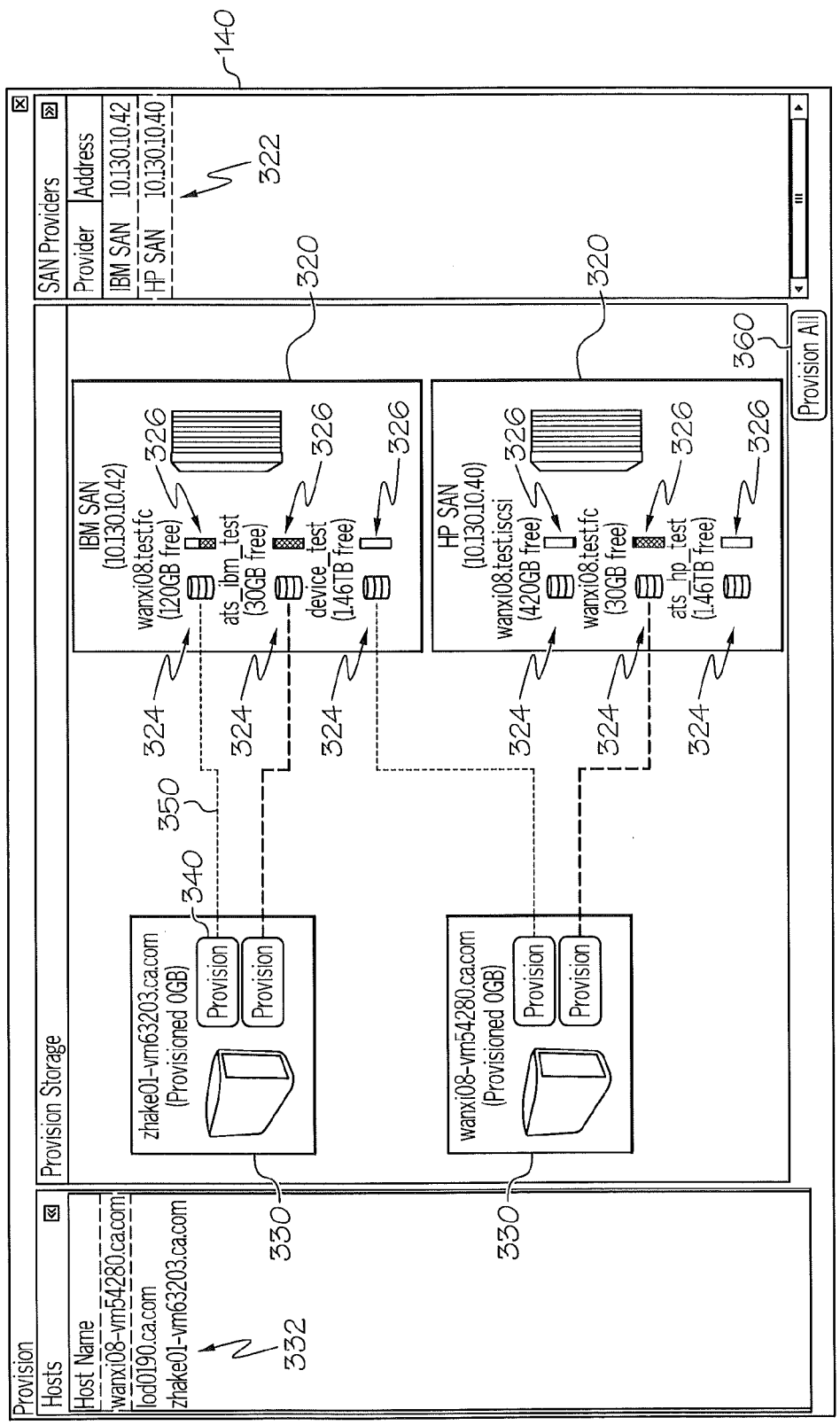
FIG. 3 illustrates a display that may be generated according to various embodiments described herein.

Referring to Block 220, a graphical representation of a plurality of available SANs and a plurality of available hosts is displayed, for example on a display of the administrator terminal 140. FIG. 3 is a screen shot of one example display that may be provided. As shown in FIG. 3, a graphical representation of available SANs 320 and a graphical representation of available hosts 330 is displayed. Optionally, a listing of the identified SANs 322 and a listing of the identified hosts 332 may also be provided. As shown, a SAN may be specified by an identifier and/or an address, such as an IP address. Moreover, in some embodiments, a given SAN may include a plurality of storage pools 324 and the graphical representation may include an optional graphical representation 326 of utilization (i.e., free or used storage) for each storage pool. In other embodiments, a graphical representation of utilization 326 may be provided for the SAN itself rather than storage pools of the SAN.

Referring again to FIG. 2, at Block 230, an administrator or other user drags and drops the graphical representation of a selected SAN 320 into the graphical representation of a selected host 330, to initiate provisioning of storage from the selected SAN to the selected host. Dragging and dropping may be provided using conventional operations of a mouse or other pointing device and/or on a touch screen of the administrator terminal 140.

Various actions may occur in response to a SAN being dragged and dropped into a host at Block 230. For example, at Block 240, optionally, a window may be provided to allow user input of credential information including security information, such as a user name and password for the selected host, and to allow user input of storage provision information. The storage provision information may include an identification of a size of the storage that is to be provisioned and, in some embodiments, of a protocol of the storage that is to be provisioned. For example, a drop-down box may be used to allow selection from a plurality of protocols, such as the device iSCSI (Internet Small Computer System Interface) or FCP (Fibre Channel Protocol) for storage connection.

In response to receiving credential and storage provisioning information at Block 240, a "Provision" button may be displayed as illustrated at 340 of FIG. 3. At Block 250, a confirmation to provision is received, for example by the administrator selecting the appropriate provision button 340 of FIG. 3. Other confirmation techniques may be used.

Referring again to FIG. 2, at Block 260, storage is provisioned from the selected SAN to the selected host. Provisioning may take place in some embodiments by calling a provisioning program that may be part of a server automation program, such as CA Server Automation that was described above. If the provisioning is unsuccessful, an error message may be provided. However, if the provisioning is successful, the graphical link, such as the link 350 of FIG. 3, that links the selected host to the selected SAN, may be changed. More specifically, as illustrated in FIG. 3, prior to provisioning, a graphical link, such as a dashed link 350, may be displayed between the graphical representation of the selected SAN and the graphical representation of the selected host 330, in response to the dragging and dropping the graphical representation of the selected SAN 320 into the graphical representation of the selected host 330 at Block 230. After provisioning at Block 260, the graphical link is changed at Block 270, for example, to a solid line link, between the graphical representation of the selected SAN 320 and the graphical representation of the selected host 330, in response to the provisioning of the storage from the selected SAN 320 to the selected host 330. Accordingly, the link 350 may provide a provisioning status indicator based on, for example, the dashed or solid line graphical representation thereof.

In other operations, the graphical links may be changed after provisioning by using different colors, fonts, sizes or line types (e.g., solid, dashed or dotted) and/or by providing other identification on the display. Moreover, as also illustrated in FIG. 3, different colors, fonts, sizes, line types and/or other identification may be provided to identify the different types of protocols that are available. For example, in some embodiments, a yellow or unbold dashed line may be used to represent iSCSI protocol, and a blue or bold dashed line may be used to represent the FCP protocol for storage connection. Thus, in some embodiments, the graphical link 350 may include a protocol indicator.

It will also be understood that a storage pool 324 of a SAN 320 may be selected by an administrator or by the provision service 160. For example, as will be described in detail below, a graphical representation of a plurality of storage pools 324 for at least one of the plurality of SANs 320 may be displayed, and the provisioning may comprise provisioning storage from a selected storage pool of a selected SAN to a selected host in response to dragging and dropping the graphical representation of the selected storage pool of the selected SAN into the graphical representation of the selected host. In other embodiments, a SAN 320 may be selected, and the provision service 160 may identify a storage pool 324 of the selected SAN 320 for provisioning. Then, storage is provisioned from the storage pool 324 of the selected SAN 320 that was identified to the selected host 330 in response to dragging and dropping the graphical representation of the selected SAN 320 into the graphical representation of the selected host 330. Thus, the administrator may select a storage pool 324, or the provision service 160 may select a storage pool.

Moreover, in still other embodiments, a plurality of drag-and-drop operations may be performed, and provisioning may then be confirmed after the plurality of drag-and-drop operations are performed, for example by selecting a "Provision All" button 360 of FIG. 3. Other selection techniques may be used, including a context (right-click menu), depressing an "Enter" key or a "Function" key, etc. Thus, in these embodiments, the provisioning comprises provisioning storage from a plurality of selected SANs for a plurality of selected hosts in response to repeatedly dragging and dropping a representation of a selected one of the SANs 320 into a representation of a selected one of the hosts 330 and further in response to receiving a confirmation to provision all, for example by selecting the "Provision All" button 360.

Figure 4:
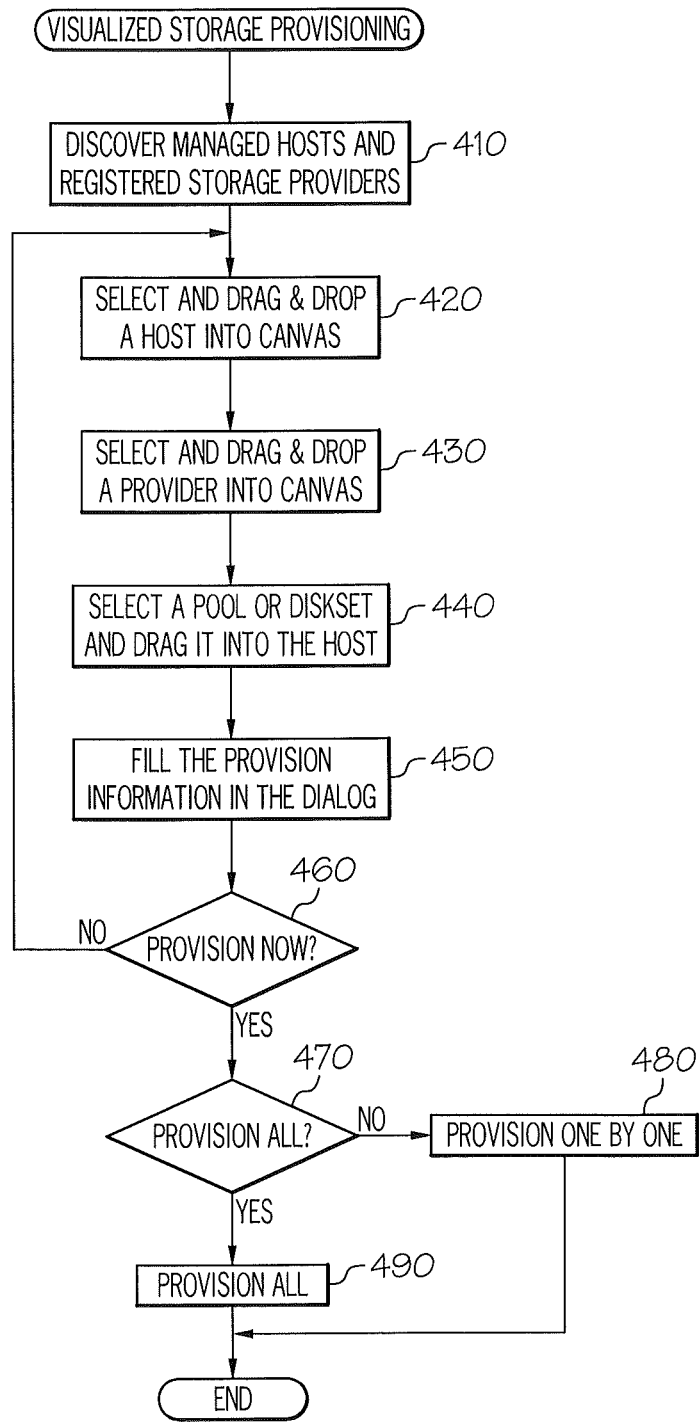
FIG. 4 is a flowchart of operations that may be performed for visualized storage provisioning according to various other embodiments described herein.

FIG. 4 is a flowchart of operations that may be performed to provide visualized storage provisioning according to various other embodiments described herein. These operations may be performed by a visualized storage provisioning manager 150 of FIG. 1. FIGS. 5A-5J illustrate displays that may be generated when performing operations according to FIG. 4, according to various other embodiments described herein.

Referring now to FIG. 4, at Block 410, managed hosts and registered storage providers are discovered, for example using techniques that were described above in connection with Block 210. The managed hosts 332 and registered storage providers 322 may be displayed on a display 140 of FIG. 5A.

Figure 5A:
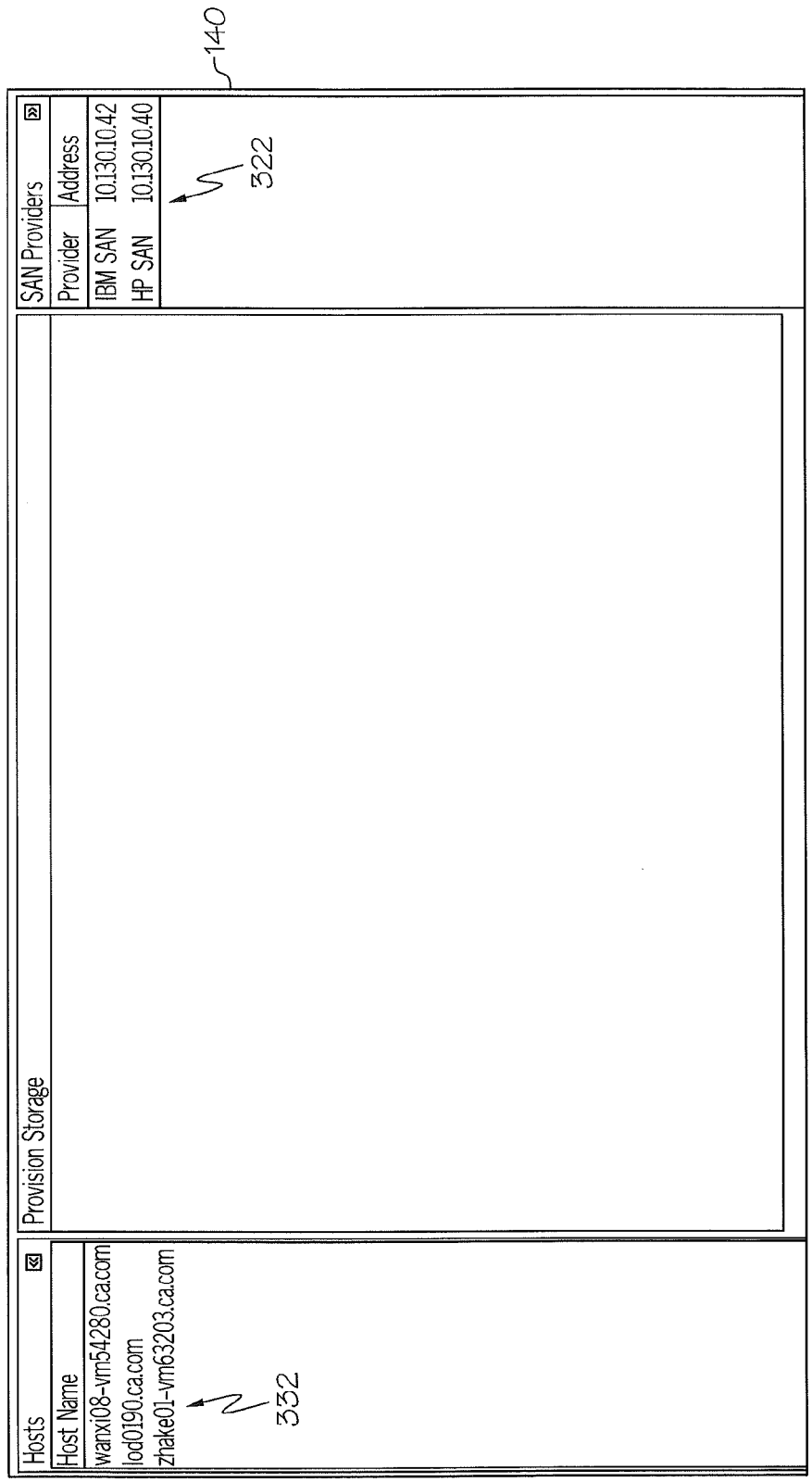
FIGS. 5A-5J illustrate displays that may be generated according to various other embodiments described herein.
Figure 5B:
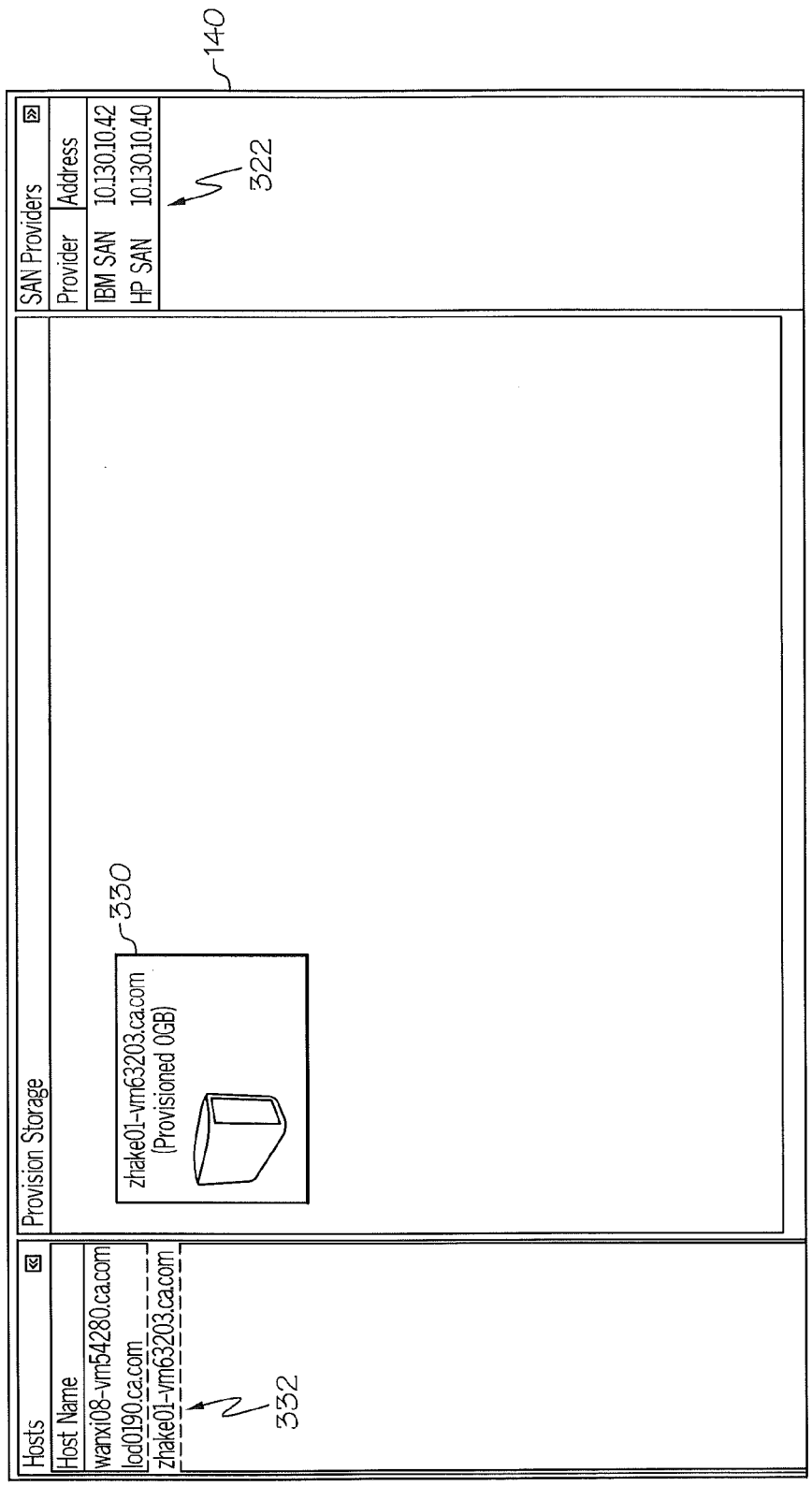
Figure 5C:
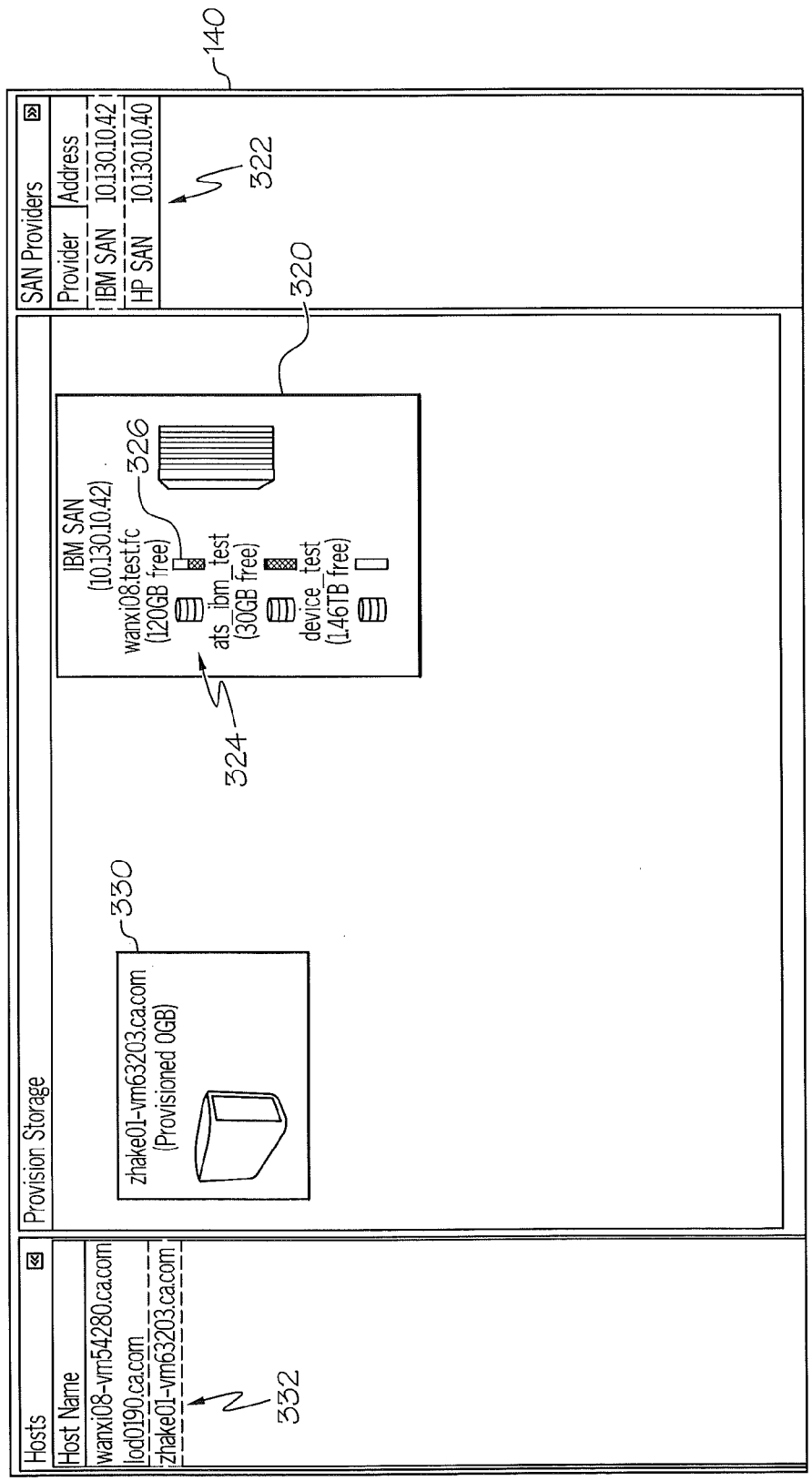

Then, at Block 420, a host 330 is selected and dragged and dropped onto the canvas as illustrated, for example, in FIG. 5B. At Block 430, a provider 320 is selected and dragged and dropped onto the canvas, as illustrated in FIG. 5C. Thus, operations at Blocks 420 and 430 may provide the operations of Block 230 of FIG. 2.

Figure 5D:
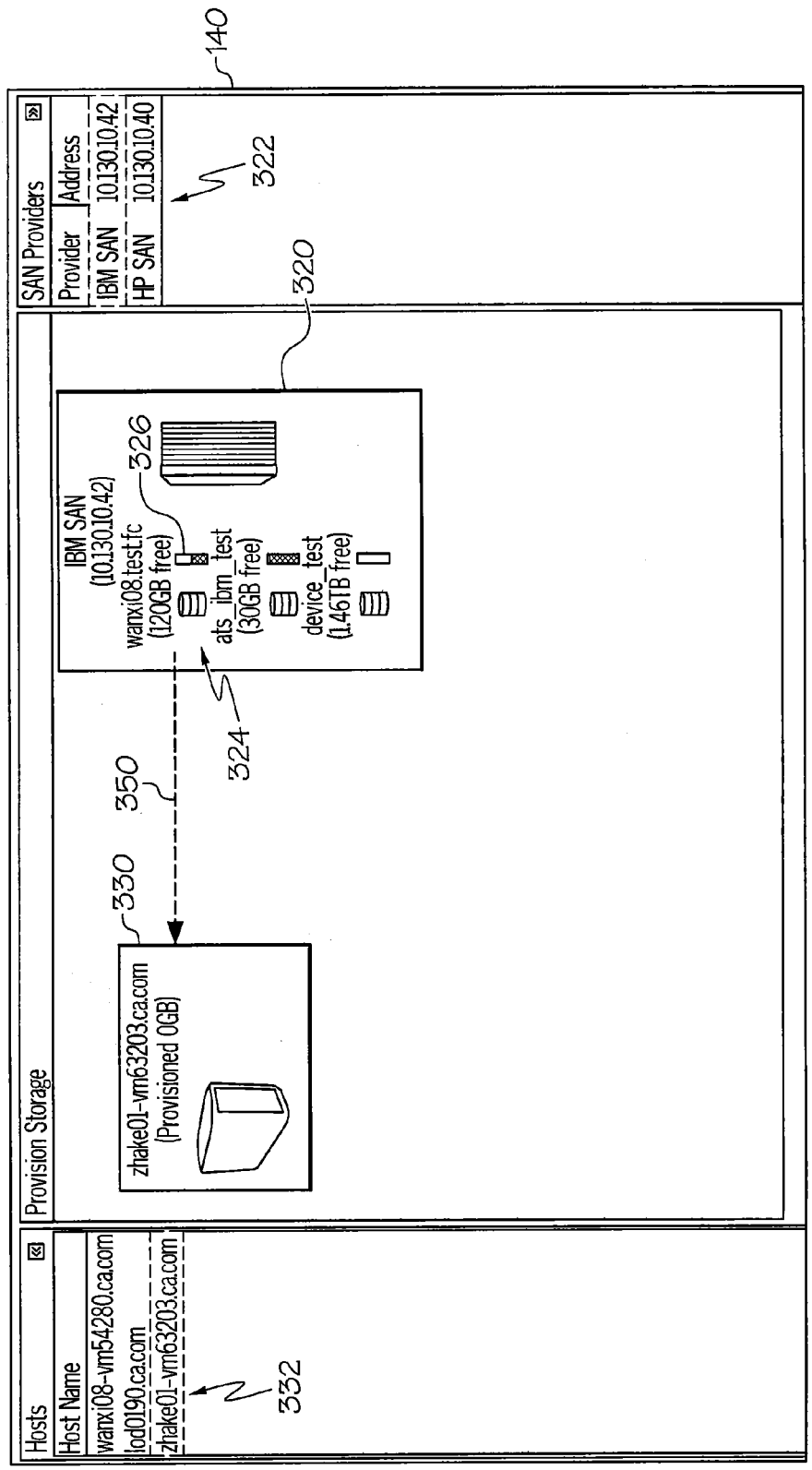
Figure 5E:
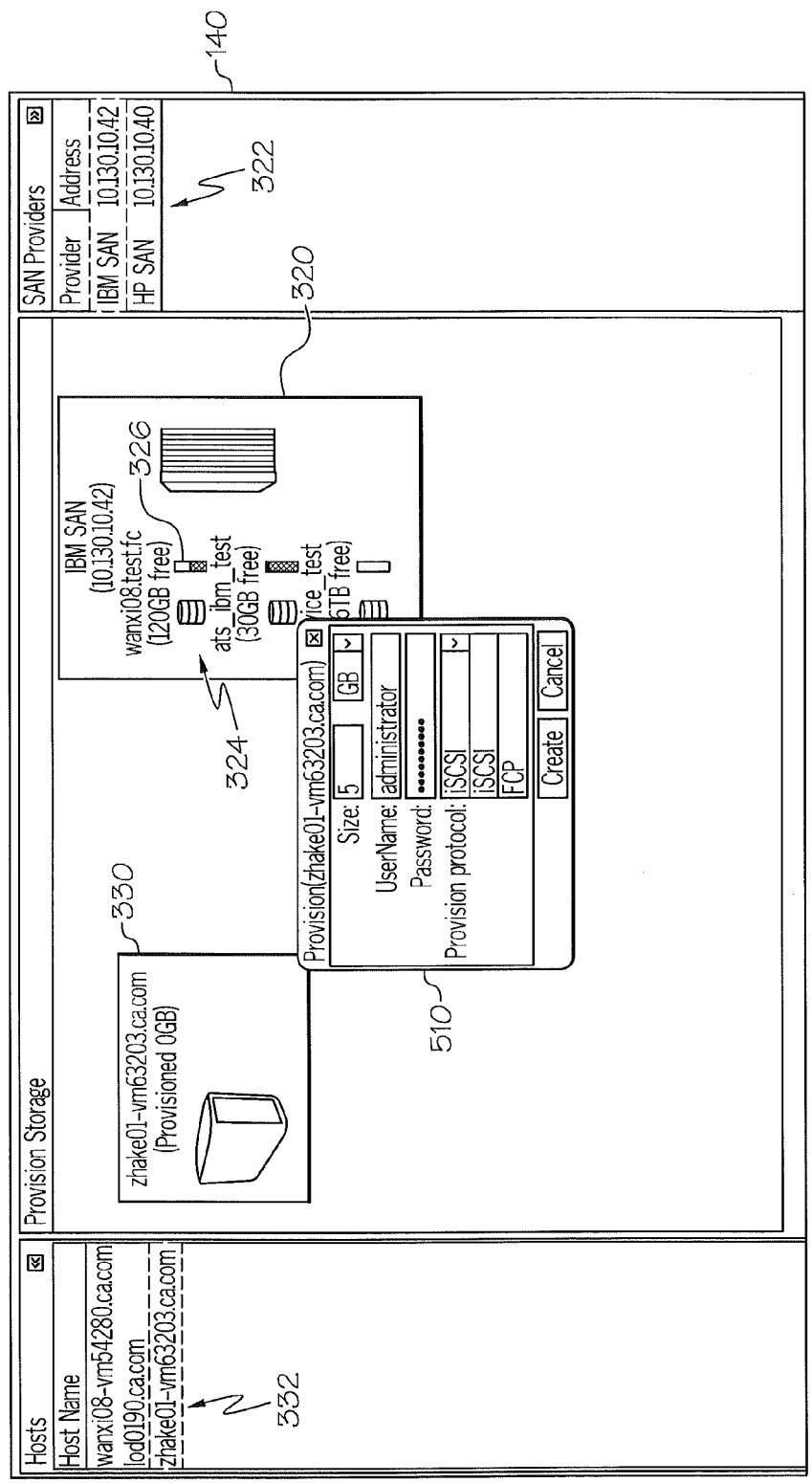

Then, referring to Block 440, a pool or diskset 324 is selected and dragged into the host 330, as illustrated in FIG. 5D by line 350. These Operations may correspond to operations of Block 230 described above. At Block 450, credential and provisioning information is filled in the dialog box 510, as illustrated in FIG. 5E, which may correspond to the operations of Block 240 described above.

Figure 5F:
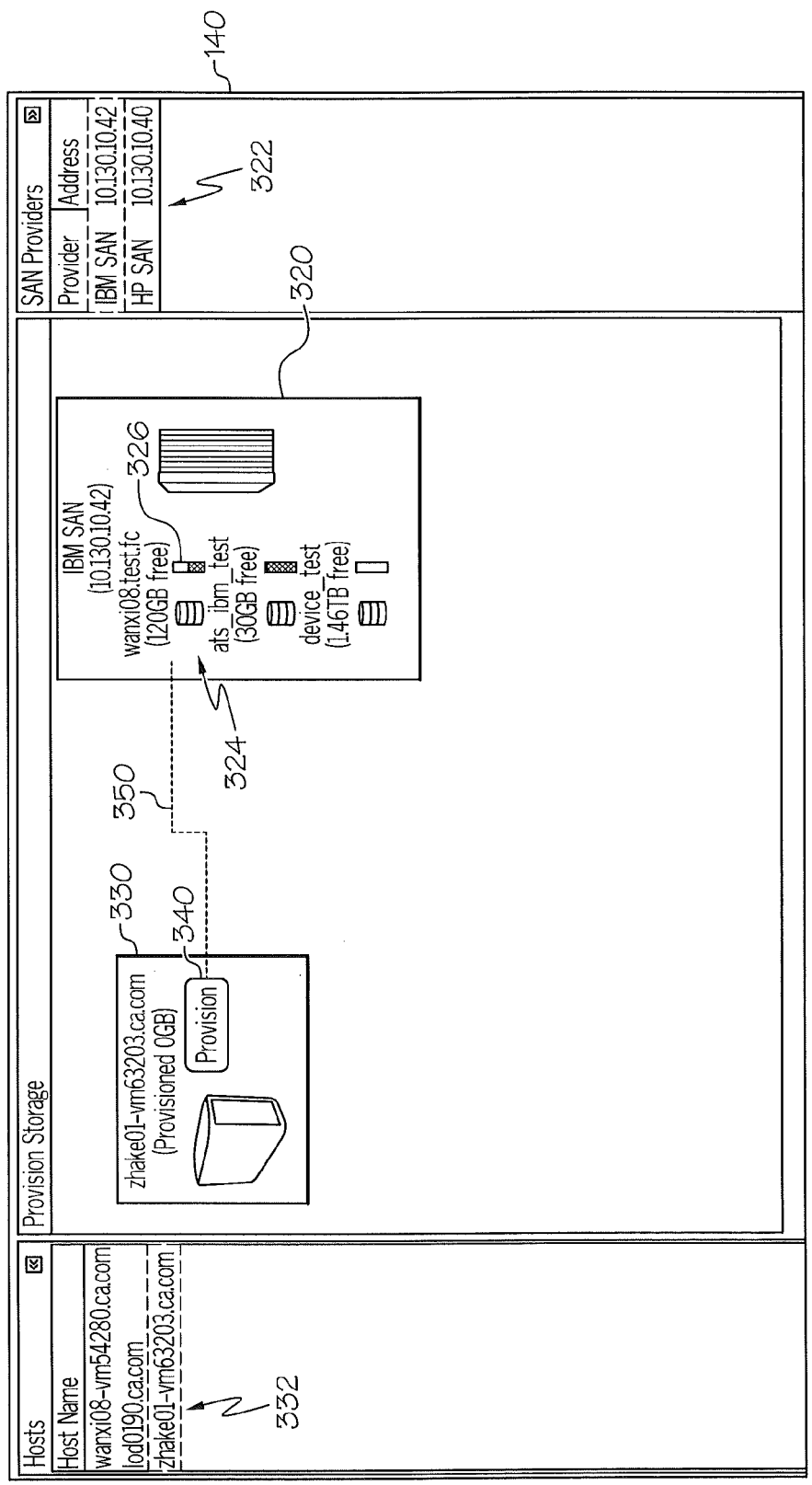
Figure 5G:
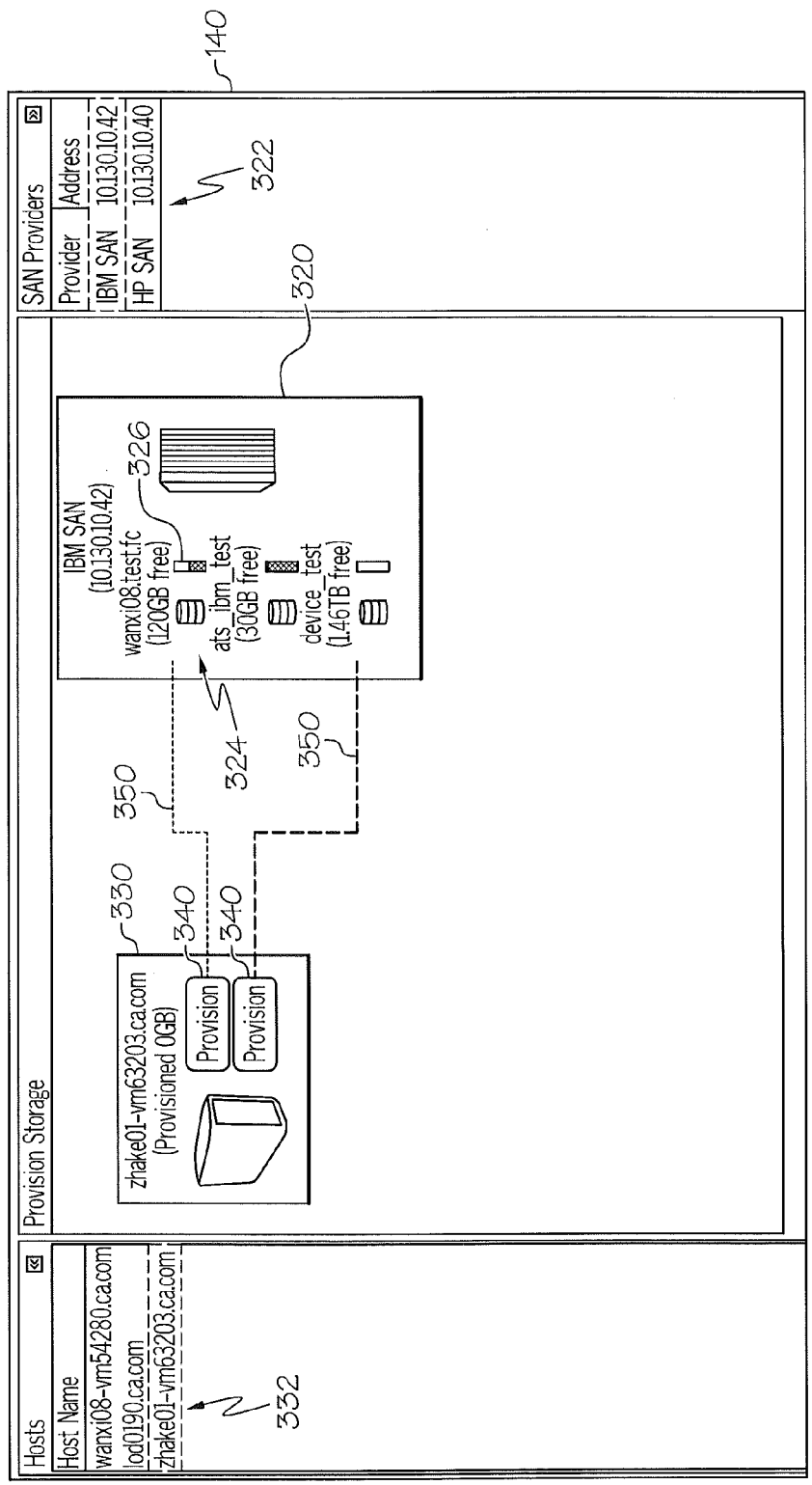
Figure 5H:
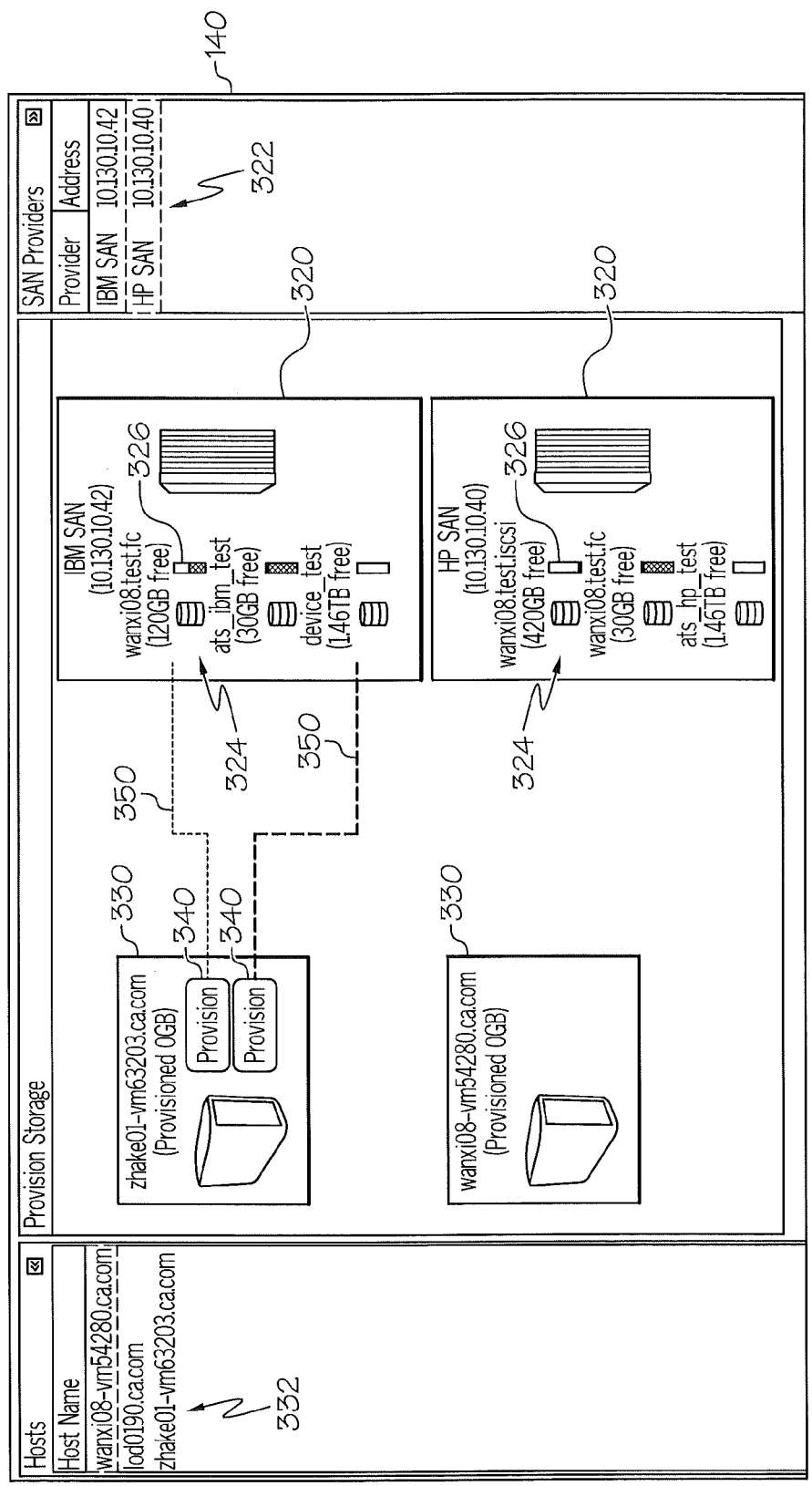
Figure 5I:
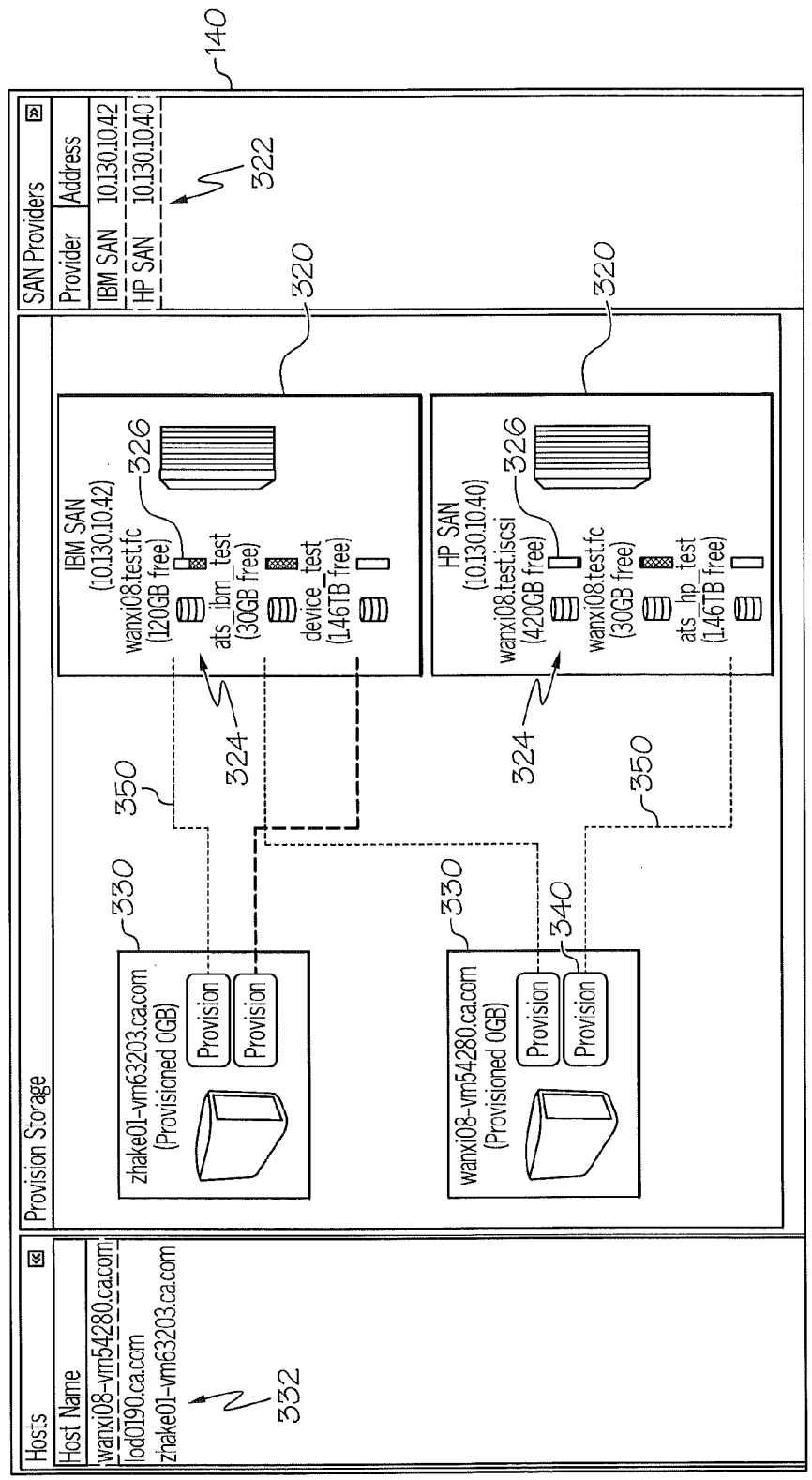
Figure 5J:
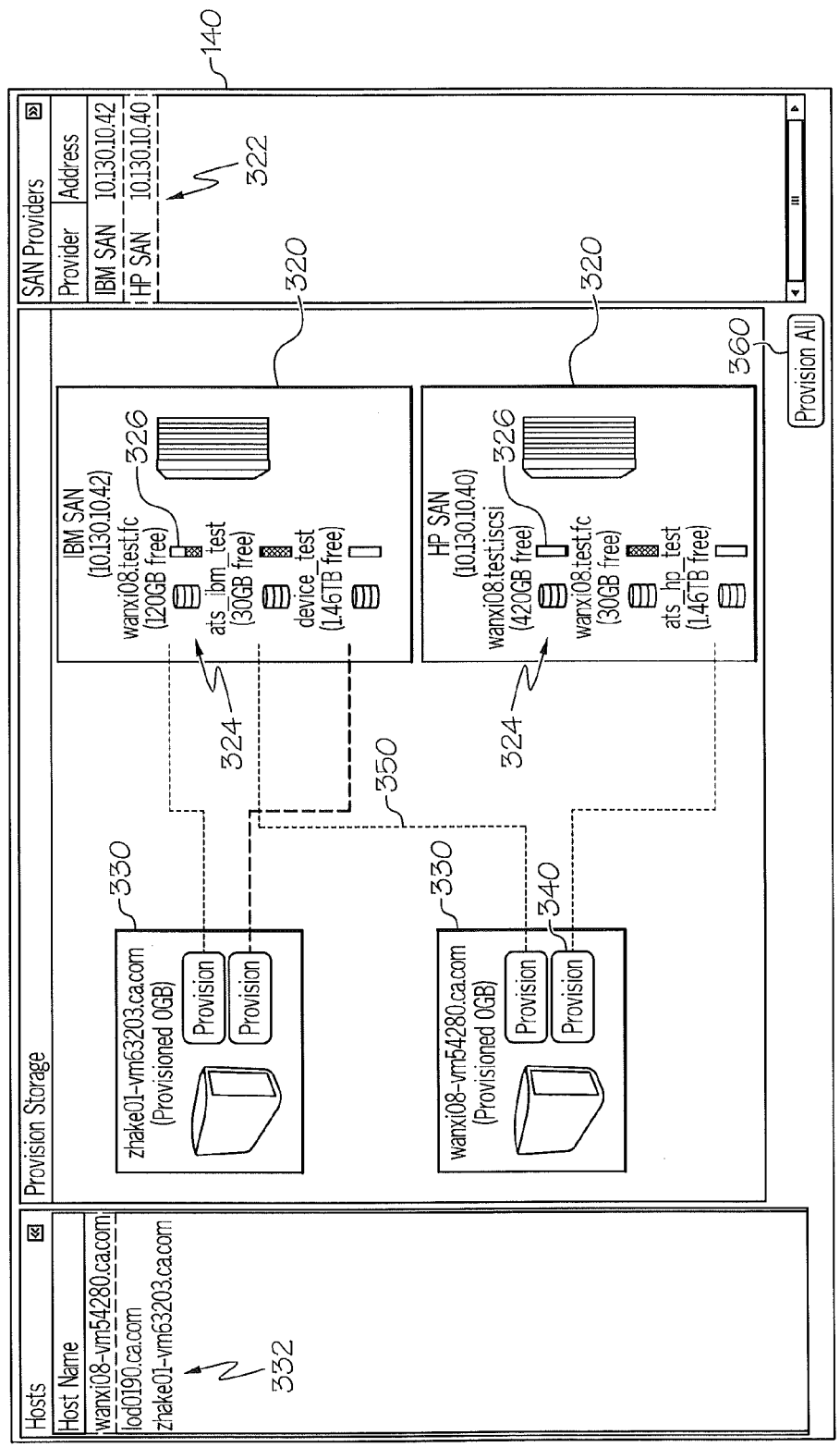

At Block 460, provisioning may take place by selecting a Provision button 340, as illustrated in FIG. 5F. Selection of the Provision button 340 may provide an embodiment of Block 250 of FIG. 2. Alternatively, at Block 460, if the provision button 340 of FIG. 5F is not clicked, then operations of Blocks 420, 430, 440 and 450 may be performed again, as illustrated in FIGS. 5G, 5H and 5I. The individual selections may be provisioned by clicking the appropriate Provision button 340 in any of these figures, to provide provisioning one by one at Block 480. Alternatively, at Block 470, if "provision all" is selected by clicking on the "Provision All" button 360, as illustrated in FIG. 5J, all of the provisioning takes place at Block 490. Thus, Blocks 460 and 470 may correspond to Block 250 of FIG. 2 and Blocks 480 and 490 may correspond to Block 260 of FIG. 2. In general, a user can provision one-by-one or in one shot.

As will be appreciated by one of skill in the art, various embodiments described herein may be embodied as a method, data processing system, and/or computer program product. Furthermore, embodiments may take the form of a computer program product on a tangible computer readable storage medium having computer program code embodied in the medium that can be executed by a computer.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computer environment or offered as a service such as a Software as a Service (SaaS).

Some embodiments are described herein with reference to flowchart illustrations and/or block diagrams of methods, systems and computer program products according to embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall support claims to any such combination or subcombination.

In the drawings and specification, there have been disclosed typical embodiments and, although specific terms are employed, they are used in a generic and descriptive sense only and not for purposes of limitation, the scope of the disclosure being set forth in the following claims.

What is claimed is:

1. A method comprising:
    displaying a listing of a plurality of registered Storage Area Networks (SANs) in a first portion of a display and a listing of a plurality of hosts in a second portion of the display, the first portion of the display not including a listing of a host therein and the second portion of the display not including a listing of a SAN therein;

placing a graphical representation of a plurality of available SANs in a third portion of the display in response to receiving a selection of the plurality of available SANs from the listing of the plurality of registered SANs in the first portion of the display;

placing a graphical representation of a plurality of available hosts in the third portion of the display in response to receiving a selection of the plurality of available hosts from the listing of the plurality of managed hosts in the second portion of the display;

repeatedly identifying a dragging and dropping of the graphical representation of a selected SAN that is graphically represented in the third portion of the display onto the graphical representation of a selected host that is graphically represented in the third portion of the display, the repeatedly identifying a dragging and dropping being analyzed to define one-to-many relationships among one of the selected SANs and a plurality of the selected hosts and among one of the selected hosts and a plurality of the selected SANs;

displaying a plurality of graphical links connecting the graphical representations of the plurality of available SANs and the plurality of available hosts in response to the repeatedly identifying a dragging and dropping, a position of the plurality of graphical links identifying the one-to-many relationships among the one of the selected SANs and the plurality of the selected hosts and among the one of the selected hosts and the plurality of the selected SANs;

provisioning storage from the selected SANs of the plurality of available SANs that are graphically represented in the third portion of the display to all selected hosts of the plurality of available hosts that are graphically represented in the third portion of the display, based on the one-to-many relationships among the one of the selected SANs and the plurality of the selected hosts and among the one of the selected hosts and the plurality of the selected SANs in response to receiving a selection to provision all; and changing an appearance of the plurality of graphical links connecting the graphical representations of the plurality of available SANs and the plurality of available hosts in response to the provisioning being successful, wherein the first, second and third portions of the display are nonoverlapping.

2. The method according to claim 1:

wherein the displaying a listing further comprises displaying a graphical representation of a plurality of storage pools for at least one of the plurality of SANs in the first portion of the display; and wherein the placing a graphical representation of a plurality of available SANs, the repeatedly identifying, the displaying a plurality of graphical links, the provisioning storage and the changing are all performed with respect to the plurality of storage pools.

3. The method according to claim 1 wherein the plurality of graphical links comprise a plurality of lines, wherein a characteristic of a respective line provides a protocol indicator and a provisioning status indicator.

4. The method according to claim 1:

wherein the placing a graphical representation of a plurality of available SANs in a third portion of the display in response to receiving a selection of the plurality of available SANs from the listing of the plurality of registered SANs in the first portion of the display comprises placing the graphical representation of the plurality of available SANs in the third portion of the display in response to identifying a dragging and dropping of the plurality of available SANs from the listing of the plurality of registered SANs in the first portion of the display into the third portion of the display; and wherein the placing a graphical representation of a plurality of available hosts in the third portion of the display in response to receiving a selection of the plurality of available hosts from the listing of the plurality of managed hosts in the second portion of the display comprises placing the graphical representation of the plurality of available hosts in the third portion of the display in response to identifying a dragging and dropping of the plurality of available hosts from the listing of the plurality of managed hosts in the second portion of the display into the third portion of the display.

5. The method according to claim 1 wherein the first portion is adjacent a first edge of the display, the second portion is adjacent a second edge of the display that is opposite the first edge, and the third portion is between the first and second portions.

6. The method according to claim 1 wherein the provisioning storage from the selected SANs of the plurality of available SANs that are graphically represented in the third portion of the display to a selected host of the plurality of available hosts that are graphically represented in the third portion of the display, based on the one-to-many relationships among the one of the selected SANs and the plurality of the selected hosts and among the one of the selected hosts and the plurality of the selected SANs in response to receiving a selection to provision all comprises:

assigning storage from the selected SAN of the plurality of available SANs that are graphically represented in the third portion of the display to the selected host of the plurality of available hosts that are graphically represented in the third portion of the display, based on the one-to-many relationships among the one of the selected SANs and the plurality of the selected hosts and among the one of the selected hosts and the plurality of the selected SANs in response to receiving the selection to provision all.

7. A computer program product, comprising:

a non-transitory tangible computer readable storage medium comprising computer readable program code embodied in the medium that when executed by at least one processor causes the at least one processor to perform operations comprising:

displaying a listing of a plurality of registered Storage Area Networks (SANs) in a first portion of a display and a listing of a plurality of hosts in a second portion of the display, the first portion of the display not including a listing of a host therein and the second portion of the display not including a listing of a SAN therein;

placing a graphical representation of a plurality of available SANs in a third portion of the display in response to receiving a selection of the plurality of available SANs from the listing of the plurality of registered SANs in the first portion of the display;

placing a graphical representation of a plurality of available hosts in the third portion of the display in response to receiving a selection of the plurality of available hosts from the listing of the plurality of managed hosts in the second portion of the display;

repeatedly identifying a dragging and dropping of the graphical representation of a selected SAN that is graphically represented in the third position of the display onto the graphical representation of a selected host that is graphically represented in the third portion of the display, the repeatedly identifying a dragging and dropping being analyzed to define one-to-many relationships among one of the selected SANs and a plurality of the selected hosts and among one of the selected hosts and a plurality of the selected SANs;

displaying a plurality of graphical links connecting the graphical representations of the plurality of available SANs and the plurality, of available hosts in response to the repeatedly identifying a dragging and dropping, a position of the plurality of graphical links identifying the one-to-many relationships among the one of the selected SANs and the plurality of the selected hosts and among the one of the selected hosts and the plurality of the selected SANs, provisioning storage from the selected SANs of the plurality of available SANs that are graphically represented in the third portion of the display to all selected hosts of the plurality of available hosts that are graphically represented in the third portion of the display, based on the one-to-many relationships among the one of the selected SANs and the plurality of the selected hosts and among the one of the selected hosts and the plurality of the selected SANs in response to receiving a selection to provision all; and changing an appearance of the plurality of graphical links connecting the graphical representations of the plurality of available SANs and the plurality of available hosts in response to the provisioning being successful, wherein the first, second and third portions of the display are nonoverlapping.

8. The computer program product according to claim 7:
wherein the displaying a listing further comprises displaying a graphical representation of a plurality of storage pools for at least one of the plurality of SANs in the first portion of the display; and
wherein the placing a graphical representation of a plurality of available SANs, the repeatedly identifying, the displacing a plurality of graphical links, the provisioning storage and the changing are all performed with respect to the plurality of storage pools.

9. The computer program product according to claim 7:
wherein the placing a graphical representation of a plurality of available SANs in a third portion of the display in response to receiving a selection of the plurality of available SANs from the listing of the plurality of registered SANs in the first portion of the display comprises placing the graphical representation of the plurality of available SANs in the third portion of the display in response to identifying a dragging and dropping of the plurality of available SANs from the listing of the plurality of registered SANs in the first portion of the display into the third portion of the display; and
wherein the placing a graphical representation of a plurality of available hosts in the third portion of the display in response to receiving a selection of the plurality of available hosts from the listing of the plurality of managed hosts in the second portion of the display comprises placing the graphical representation of the plurality of available hosts in the third portion of the display in response to identifying a dragging and dropping of the plurality of available hosts from the listing of the plurality of managed hosts in the second portion of the display into the third portion of the display.

10. The computer program product according to claim 7 wherein the first portion is adjacent a first edge of the display, the second portion is adjacent a second edge of the display that is opposite the first edge, and the third portion is between the first and second portions.

11. A system comprising:
at least one processor; and
at least one memory coupled to the at least one processor and comprising computer readable program code embodied in the at least one memory that when executed by the at least one processor causes the at least one processor to perform operations comprising:
displaying a listing of a plurality of registered Storage Area Networks (SANs) in a first portion of a display and a listing of a plurality of hosts in a second portion of the display, the first portion of the display not including a listing of a host therein and the second portion of the display not including a listing of a SAN therein;
placing a graphical representation of a plurality of available SANs in a third portion of the display in response to receiving a selection of the plurality of available SANs from the listing of the plurality of registered SANs in the first portion of the display;
placing a graphical representation of a plurality of available hosts in the third portion of the display in response to receiving a selection of the plurality of available hosts from the listing of the plurality of managed hosts in the second portion of the display;
repeatedly identifying a dragging and dropping of the graphical representation of a selected SAN that is graphically represented in the third portion of the display onto the graphical representation of a selected host that is graphically represented in the third portion of the display, the repeatedly identifying a dragging and dropping being analyzed to define one-to-many relationships among one of the selected SANs and a plurality of the selected hosts and among one of the selected hosts and a plurality of the selected SANs;
displaying a plurality of graphical links connecting the graphical representations of the plurality of available SANs and the plurality of available hosts in response to the repeatedly identifying a dragging and dropping, a position of the plurality of graphical links identifying the one-to-many relationships among the one of the selected SANs and the plurality of the selected hosts and among the one of the selected hosts and the plurality of the selected SANs;
provisioning storage from the selected SANs of the plurality of available SANs that are graphically represented in the third portion of the display to all selected hosts of the plurality of available hosts that are graphically represented in the third portion of the display, based on the one-to-many relationships among the one of the selected SANs and the plurality of the selected hosts and among the one of the selected hosts and the plurality of the selected SANs in response to receiving a selection to provision all; and
changing an appearance of the plurality of graphical links connecting the graphical representations of the plurality of available SANs and the plurality of available hosts in response to the provisioning being successful,
wherein the first, second and third portions of the display are nonoverlapping.

12. The system according to claim 11:
wherein the displaying a listing further comprises displaying a graphical representation of a plurality of storage pools for at least one of the plurality of SANs in the first portion of the display; and wherein the placing a graphical representation of a plurality of available SANs, the repeatedly identifying, the displacing a plurality of graphical links, the provisioning storage and the changing are all performed with respect to the plurality of storage pools.

13. The system according to claim 11:

wherein the placing a graphical representation of a plurality of available SANs in a third portion of the display in response to receiving a selection of the plurality of available SANs from the listing of the plurality of registered SANs in the first portion of the display comprises placing the graphical representation of the plurality of available SANs in the third portion of the display in response to identifying a dragging and dropping of the plurality of available SANs from the listing of the plurality of registered SANs in the first portion of the display into the third portion of the display; and wherein the placing a graphical representation of a plurality of available hosts in the third portion of the display in response to receiving a selection of the plurality of available hosts from the listing of the plurality of managed hosts in the second portion of the display comprises placing the graphical representation of the plurality of available hosts in the third portion of the display in response to identifying a dragging and dropping of the plurality of available hosts from the listing of the plurality of managed hosts in the second portion of the display into the third portion of the display.

14. The system according to claim 11 wherein the first portion is adjacent a first edge of the display, the second portion is adjacent a second edge of the display that is opposite the first edge, and the third portion is between the first and second portions.

* * * * *